United States Patent [19]

Marker et al.

[11] Patent Number: 5,218,763
[45] Date of Patent: Jun. 15, 1993

[54] METHOD FOR MANUFACTURING A SWAGED PISTON ASSEMBLY FOR AN AUTOMOTIVE AIR CONDITIONING COMPRESSOR

[75] Inventors: Ronald E. Marker, New Lebanon; Daniel A. Rhule, New Lebanon; Joseph A. Untener, Kettering, all of Ohio

[73] Assignee: General Motors Corporation, Detroit, Mich.

[21] Appl. No.: 912,364

[22] Filed: Jul. 13, 1992

[51] Int. Cl.[5] ............................................. B23P 11/00
[52] U.S. Cl. ........................... 29/888.092; 29/888.051; 74/579 R; 123/193.6
[58] Field of Search ..................... 29/888.042, 888.044, 29/888.051, 521; 74/579 R; 123/193.6

[56] References Cited

U.S. PATENT DOCUMENTS

| 593,470 | 11/1897 | Heaton | 123/193.6 |
|---|---|---|---|
| 1,813,930 | 7/1931 | James . | |
| 3,263,311 | 8/1966 | Riedhammer et al. | 29/888.051 |
| 3,354,791 | 11/1967 | Wahlmark . | |
| 3,808,956 | 5/1974 | Knapp | 29/888.044 |
| 4,321,987 | 3/1982 | Dressell, Jr. et al. | 29/888.044 |
| 4,573,250 | 3/1986 | Miller et al. | 29/888.044 |
| 4,709,621 | 12/1987 | Matsui et al. | 29/888.042 |
| 4,815,360 | 3/1989 | Winterle | 29/888.051 |
| 4,872,370 | 10/1989 | Benton et al. . | |
| 4,932,314 | 6/1990 | Baris | 123/193.6 |
| 4,981,070 | 1/1991 | Larsen . | |

FOREIGN PATENT DOCUMENTS

1187680  9/1959  France ............................ 29/888.051

Primary Examiner—Irene Cuda
Attorney, Agent, or Firm—Patrick M. Griffin

[57] ABSTRACT

A method of forming a composite piston assembly for an automotive air conditioning compressor includes providing 1018 steel alloy, solid connecting rod with an aluminum alloy head. An axial receiving bore is provided in the piston head, which is also fabricated of solid bar stock, and includes a frusto-conically-shaped counterbore. The connecting rod includes a positioning collar that defines a tenon received in said bore. A cold swaged tip of the connecting rod flares outward so as to conform to and fill the counterbore and provide a strong fixed attachment joint between the connecting rod and piston head.

2 Claims, 1 Drawing Sheet

METHOD FOR MANUFACTURING A SWAGED PISTON ASSEMBLY FOR AN AUTOMOTIVE AIR CONDITIONING COMPRESSOR

TECHNICAL FIELD

The present invention relates generally to piston assemblies and, more particularly, to a composite piston assembly utilized in an automotive air conditioning compressor and a method of fabrication.

BACKGROUND OF THE INVENTION

Variable displacement compressors are being established as the preferred means for compressing refrigerant in air conditioning systems of present day motor vehicles. The compressor typically includes a plurality of cylinders, each adapted to receive a piston for reciprocal compressing action. As is commonly known, the piston includes a piston head sealed around the inner annular surface of the cylinder, and a piston rod driving the piston head to provide the desired compressive action.

A typical design places a number of radially disposed cylinders equally angularly spaced about the axis of a central drive shaft. A swash plate or wobble plate is received about and is operatively connected to the drive shaft. The swash plate responds to the drive movement by nutating about the drive shaft, and this motion then converts to a linear reciprocating motion of the individual pistons. This motion and cooperative interaction dictates that the simplest head configuration is of the type defining a curved, annular sealing surface, and the most effective connection between the swash plate and the end of the associated piston rod is a ball joint.

Historically, pistons for swash plate compressors of this type have been of unitary construction, machined from a durable metal body, such as a steel alloy. This prior art construction provides the desired strength, but unfortunately has an undesirably high machining cost, and a relatively high mass. It can be appreciated that substantial momentum and inertia forces are produced, due to the extreme acceleration imparted to a compressor piston. Accordingly, there is a need to reduce the mass of the piston itself in order to reduce the inertia forces generated by the piston action.

Recent designs have concentrated efforts away from such unitary piston fabrication, and more to making composite piston assemblies. A common approach is to attach an aluminum piston head to a steel connecting rod. In this way, the overall piston mass is reduced by substituting a lighter weight aluminum for the piston head.

A typical design configuration for this type of composite piston assembly is provided by a cast piston head having a central spherical pocket. In turn, the connecting rod is fabricated with an integral ball fixed to the end for receipt in the pocket of the piston head. In this way, a swivel joint engagement between the connecting rod ball and spherical pocket of the piston head accommodates the radial and axial displacements resulting from the nutating motion of the swash plate. For purposes of the present disclosure, this piston/connecting rod configuration will be referred to as the "ball-type".

While this "ball-type" design effectively reduces piston mass, further improvements are needed. For example, it is desired to have a simplified and reliable piston design, and one that greatly reduces the fabrication time. A move back to the "fixed attachment" design, that is without a ball joint in the piston, but wherein the head is curved to accommodate the swivel/reciprocating movement of the assembly is indicated. In doing so, the connecting rod does not have to have either a machined spherical pocket, or a journal washer and retainer clip to close the pocket. These two extra parts of the piston head assembly that substantially increase the cost, and complicate the manufacturing process, are not needed.

In the fabrication process of the ball-type connection, the inner surface of the spherical pocket must not only be machined, but finished to remove burrs or any other surface defects produced in the casting process. This need to provide a smooth, friction-reduced surface for wear-compatible engagement with the steel ball of the connecting rod is expensive. Thus, it should be appreciated that this fabrication process for another reason requires an excessive amount of time, thereby also increasing the manufacturing cost. The cost is further increased by having to provide lubrication ports to maintain the low friction working joint.

Whenever individual parts, such as the journal and retainer clip of the ball-type joint, are designed for secure attachment, rigid dimensional tolerances must be achieved in order to pass acceptable quality control standards. Thus, parts that do not meet the close tolerance requirements must be discarded as scrap, thereby driving up the manufacturing cost more.

One successful example of a composite piston design approach with a "fixed attachment" head/connecting rod is disclosed in U.S. Pat. No. 5,022,313 issued Jun. 11, 1991, and entitled Composite Piston Assembly for Automotive Air Conditioning Compressor (assigned to the assignee of the present invention). The piston assembly starts with a separate piston head and connecting rod. The connecting rod is fabricated from aluminum and the piston head is a reinforced plastic, molded to the end of the connecting rod. Accordingly, the lightweight construction reduces the inertia forces on the piston head, and allows higher compressor speeds to be attained.

While this molded-type, fixed attachment piston design effectively enhances compressor performance by accommodating higher compressor speeds, like the ball-type design, further improvements are needed. For example, a shorter fabrication time and cost are desired. In order for the molded plastic to effectively grip and adhere to the connecting rod, the rod must first be prepared by providing a knurled surface for the plastic to bond. It is observed that the time required to prepare the rod surface, as well as the time needed to insert the rod in the mold, inject the plastic, and wait for the plastic to set up and harden, is unnecessarily lengthy.

It is also desired to provide a piston assembly having an improved reliability. As indicated, in the ball-type of piston assembly, the steel ball of the connecting rod swivels and rotates within the spherical piston pocket during operation. Over the life of the compressor, this combined swivel/rotary motion causes wear, especially on the journal and the retainer clip of the joint, which can eventually develop into a loose connection, and even ultimately fail. Accordingly, there is clearly a need for a new lightweight, composite piston assembly of the type having a fixed attachment and a related, more efficient fabrication process, whereby a more cost effective and reliable piston design is realized.

SUMMARY OF THE INVENTION

Accordingly, it is a primary object of the present invention to provide a method and apparatus for a composite piston assembly having a simple and efficient fabrication design, and process of manufacturing.

Another object of the present invention is to provide a more cost effective piston assembly, and a method for fabricating the same, representing substantial savings by reducing the time required for assembly.

It is still another object of the present invention to provide a cost effective composite piston assembly yielding a reduced amount of scrap material.

It is still another object of the present invention to provide a composite piston assembly with a fixed attachment joint for improved reliability.

It is yet another object of the present invention to provide a composite piston assembly having improved dimensional tolerances, thereby facilitating interchangeability and mass production.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved composite piston assembly of the fixed attachment type, and a method for fabrication, is set forth. The piston assembly comprises a solid connecting rod extending from a piston head. The rod is attached at the opposite end to a drive means (not shown), such as a wobble plate of a compressor.

The piston head is cut from a solid bar of lightweight metal, such as aluminum. The aluminum construction effectively reduces the overall mass of the piston, yet maintains adequate strength to accommodate high speed operation. A lightweight and heat resistant plastic, such as polytetrafluoroethylene, also known by the trademark TEFLON, could also be used.

Accordingly, the inertia forces are reduced significantly. The stress exerted at the piston/connecting rod attachment point is likewise advantageously reduced. This allows the compressor to operate at the higher speeds, and with a reduced noise factor, thereby improving the cooling capacity and overall comfort within the automobile passenger compartment.

A receiving bore extends axially through the center of the piston head to receive the end of the connecting rod, and has an enlarged cavity at the distal end. In the preferred embodiment, this enlarged cavity is a frusto-conically-shaped counterbore. Advantageously, the counterbore cooperates with a swaged tip of the connecting rod to provide the fixed attachment concept of the present invention. As a result of the concept, substantial added strength and endurance, and higher compressor speeds are attainable.

The connecting rod is formed of solid bar stock and has an enlarged positioning collar, and a tenon at the end to receive the piston head. The base of the piston head abuts the positioning collar, so as to appropriately position the piston head upon the connecting rod during installation. The swaged tip at the end of the tenon of the connecting rod flares outwardly, conforming to and filling the inner confines of the counterbore, and in effect forming a solid radial rivet. In this fashion, the piston head is securely positioned between the swaged tip and the enlarged collar of the connecting rod.

In the preferred embodiment, the connecting rod is fabricated by cold rolling and forming a high strength steel, such as 1018 alloy. A central receiving bore is drilled longitudinally through the piston head, and is expanded on one end by the drilled counterbore. The tenon of the connecting rod is then inserted through the receiving bore until the positioning collar contacts the piston head. The tip of the connecting rod is then swaged into the counterbore area, so as to provide a strong, solid rivet-like attachment between the connecting rod and the piston head.

The method aspect of the present invention enjoys several benefits and advantages over the prior art. For example, the fabrication time of the piston in the present invention is greatly reduced. It requires only approximately three seconds to swage the tip of the connecting rod into the counterbore of the piston head on a standard radial riveting machine. It can be appreciated that this process is much faster than that of the previous designs.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
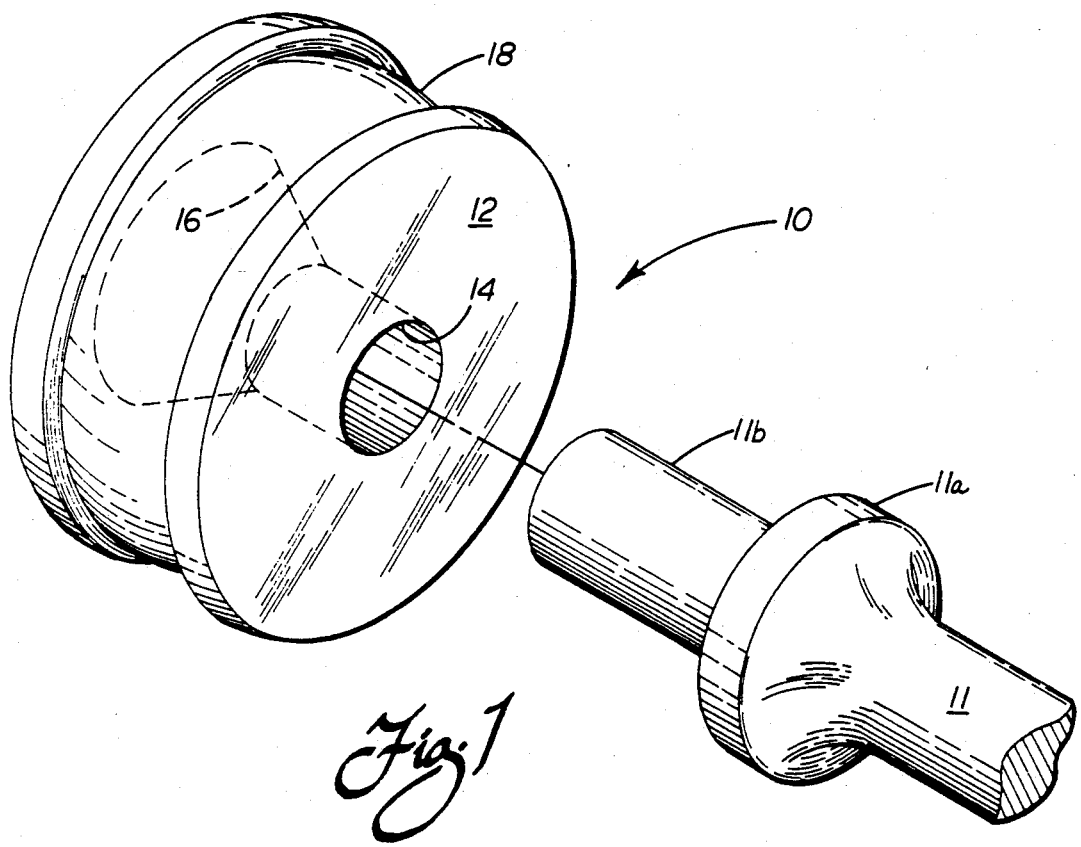
FIG. 1 shows an exploded perspective view of the piston head and connecting rod ready to be attached.

Reference is now made to FIG. 1, showing in perspective a composite piston assembly 10 of the present invention. A connecting rod 11 (cut-away) extends between a piston head 12 and a swash or wobble plate (not shown) or other drive means. The connecting rod 11 of the present invention is fabricated from a suitable steel alloy.

More specifically, the connecting rod 11 is formed through a cold rolling and forming process. In this way, the connecting rod 11 is constructed so as to be able to be easily attached to the piston head 12 by a cold swaging process by a solid radial rivet joint, as will be described in detail below. Greater accuracy and improved component tolerances are achieved by this forming process of the composite piston assembly 10. It allows for not only a stronger fixed attachment, but also for better reproducibility and interchangeability of the parts in a mass production process. Because of this fact and no need for large scale machining, there is less scrap or wasted material during the manufacturing process. Cold rolling/forming also yields greater component strength and accurate formation of the radial rivet joint.

In the preferred embodiment, the connecting rod 11 is constructed from a solid bar of 1018 (SAE number) steel alloy. This particular alloy was selected for its combined formability and strength characteristics. That is, the 1018 alloy is a plain carbon steel alloy having substantially the desired formability of low manganese grade steel alloys such as 1017, 1020, or 1025. Yet, 1018 steel has increased strength over these lower manganese grade steels, thereby improving piston assembly reliability over time.

An integral positioning collar 11a is provided near the end of the connecting rod 11. This collar 11a ensures proper positioning of the piston head 12 during installation, as well as during operation. The collar 11a serves as a driving platform for propelling the piston head 12 through the compression or discharge stroke of the compressor.

A solid tenon 11b is located at the distal end of the connecting rod 11 and is substantially the same diameter as the body of the connecting rod 11. As will be seen below, the tenon 11b effectively serves as the mating attachment with the piston head 12 to form the fixed attachment or radial rivet joint.

Figure 2:
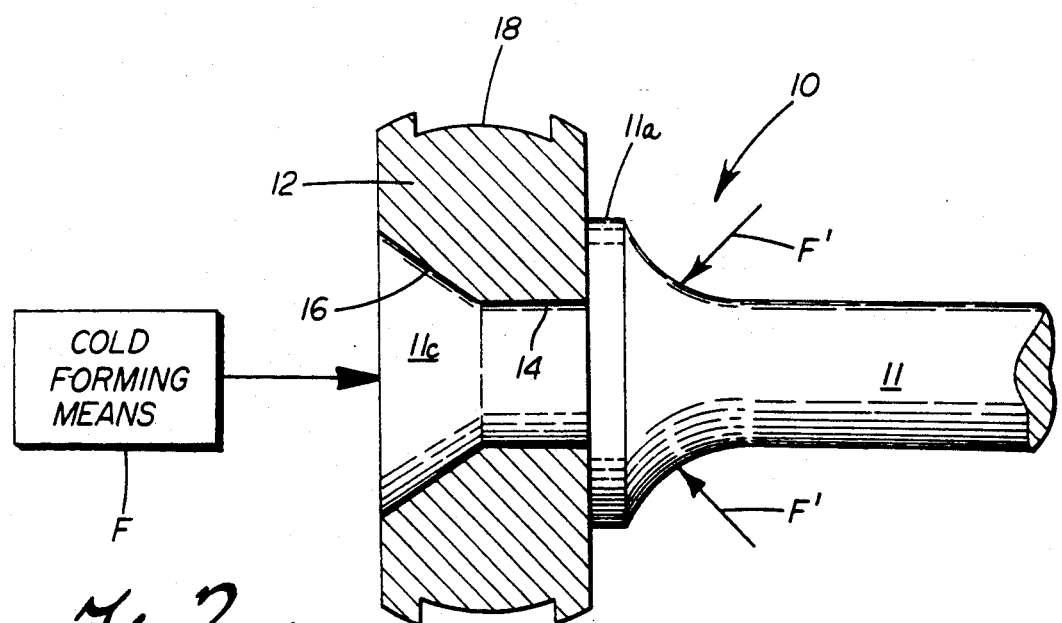
FIG. 2 is a cut-away side view showing the completed head/connecting rod attachment.

To do this, the tenon 11b includes a swaged tip 11c (see FIG. 2). The manner in which it securely locks the piston head 12 in place on the connecting rod 11 is apparent. It should be appreciated that the collar 11a/tenon 11b configuration of the present invention is also selected as providing the design strength at a minimal weight, thereby minimizing the overall mass of the piston assembly 10.

The piston head 12 is cut from a standard aluminum alloy bar. It offers a lightweight alternative to the previously discussed unitary steel designs, and yet provides adequate strength for lasting, reliable operation. A receiving bore 14 extends axially through the center of the piston head 12. The receiving bore 14 is substantially the same diameter as the tenon 11b of the connecting rod 11. In this fashion, the receiving bore 14 effectively provides a snug attachment to the tenon 11b, when the tenon 11b is inserted into the central receiving bore 14.

An enlarged or tapered cavity defines one end of the receiving bore 14. More specifically, a frusto-conically-shaped counterbore 16 is provided, advantageously providing the rivet-shaped, retentive surface for the swaged tip 11c (see FIG. 2) of the tenon 11b. Swaging the tip 11c of the solid connecting rod 11 into the expanded counterbore 16 so that it conforms and fills the cavity, greatly increases the strength of the connection. As a result, piston reliability is increased, while the weight is reduced. This lightweight, but strong piston assembly 10 can achieve higher operating speeds, thereby increasing the cooling capacity and at the same time noise is reduced.

It should be observed from FIG. 2 that the sides of the piston head 12 are curved. That is, rather than the piston head 12 being cylindrically shaped, it has a spherical outer diameter. This spherical shape serves to accommodate the fixed connection between the piston head 12 and the connecting rod 10. Since the motion of the swash plate necessarily imparts radial displacements, the piston head 12 tilts or rocks within the cylinder.

An outer annular groove 18 is provided in the aluminum piston head 12 to accommodate the insertion of a piston ring (not shown). As is commonly known in the art, the piston head 12 is designed to be slightly smaller in diameter than the diameter of the cylinder bore when the ring is used. In this way, the piston head 12 can freely reciprocate with only the ring engaging the inner wall of the cylinder bore. A piston ring of Teflon, or the like, is preferred.

In the preferred cold forming process, a Bracker radial riveting machine or an equivalent is used, as depicted by cold forming means F and counterforce arrows F' in FIG. 2. Best results are obtained by applying sufficient constant force to swage or form the tip 11c into the solid rivet shape in about three seconds when using the 1018 steel alloy. Representative critical threshold strength parameters of the piston assembly 10, thus formed, include approximately 2,100 pounds force in tension, bending momentum of approximately 335 pounds and a range of 3-6 ft. lbs. torque along the axis.

In summary, a composite piston assembly 10 with an improved fixed attachment joint design is provided. It is lightweight for reduced inertia characteristics, and thus capable of sustaining higher compressor speeds. The joint between the piston head 12 and the tenon 11b of the connecting rod 11 includes the swaged tip 11c formed as a solid radial rivet. This combination provides the increased strength required for superior performance and endurance.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A method of forming a composite piston assembly, comprising the steps of:
   providing a solid connecting rod of steel alloy capable of being cold formed;
   providing a solid aluminum piston head with a central receiving bore and tapered counterbore;
   inserting a solid tenon of said connecting rod into said receiving bore; and
   swaging a tip of said tenon to substantially conform to and fill the cavity of said counterbore;
   wherein an improved piston assembly with a fixed attachment joint for said piston head/connecting rod is provided.

2. The forming method of claim 1, wherein said swaging step includes cold forming a tenon of 1018 steel alloy for approximately three seconds.

* * * * *